Jan. 21, 1936.  G. J. MILLER ET AL  2,028,516
BRAILLE WRITER
Filed Sept. 17, 1932  5 Sheets-Sheet 1
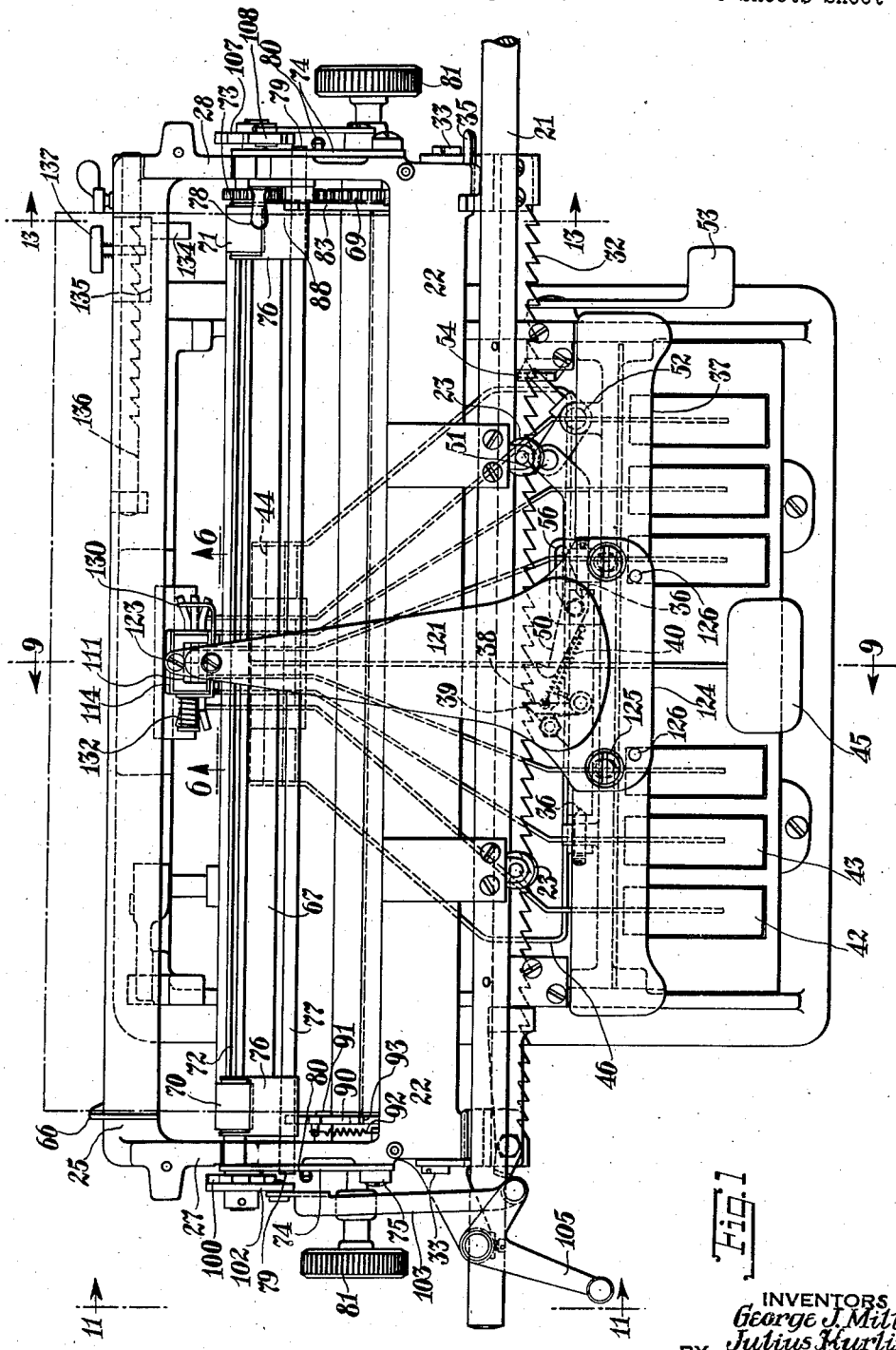
INVENTORS
George J. Miller
Julius Hurliman
BY
ATTORNEY

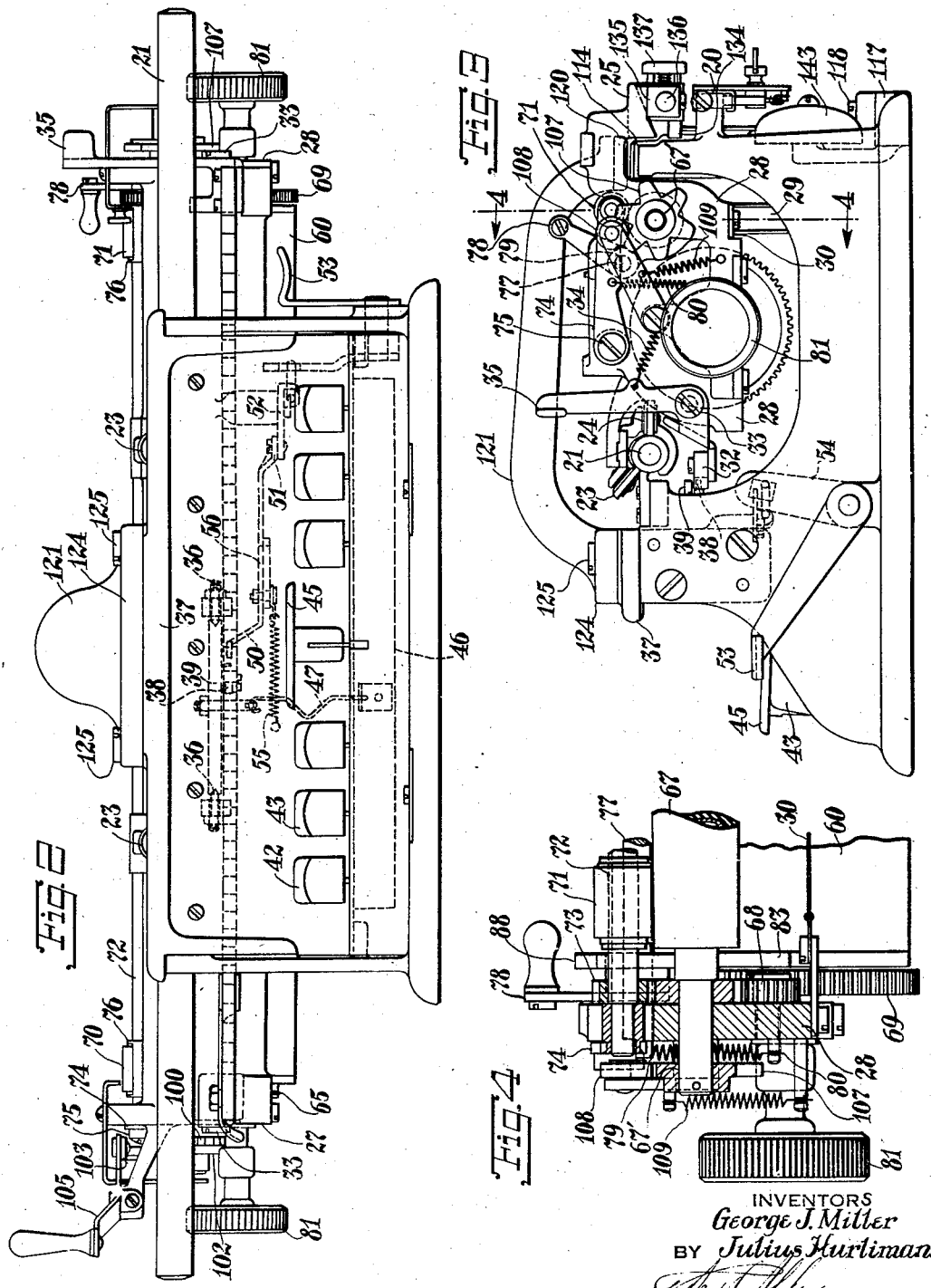

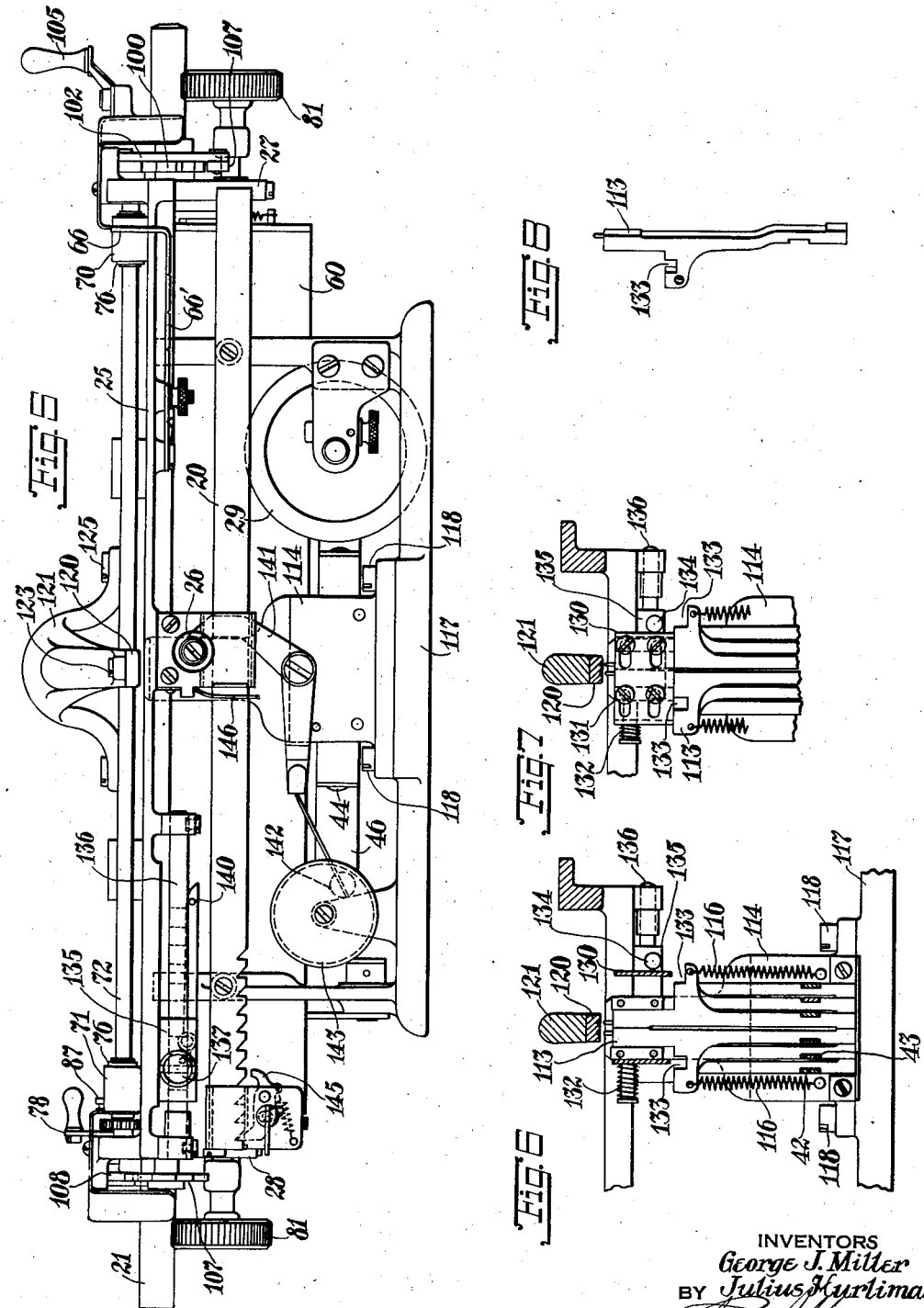

Jan. 21, 1936.  G. J. MILLER ET AL  2,028,516
BRAILLE WRITER
Filed Sept. 17, 1932   5 Sheets-Sheet 4
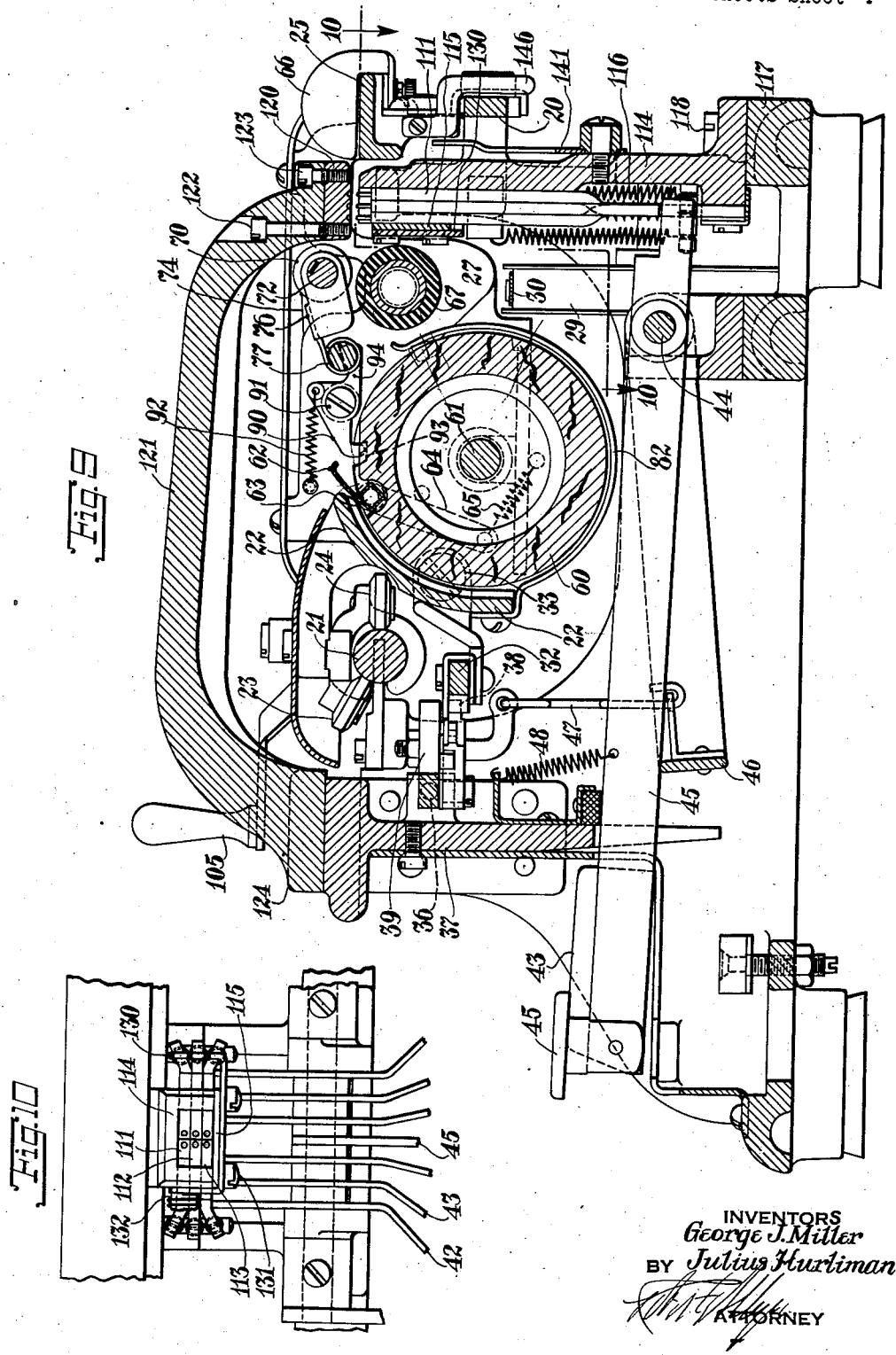
INVENTORS
George J. Miller
BY Julius Hurliman
ATTORNEY Jan. 21, 1936.  G. J. MILLER ET AL  2,028,516
BRAILLE WRITER
Filed Sept. 17, 1932   5 Sheets-Sheet 5
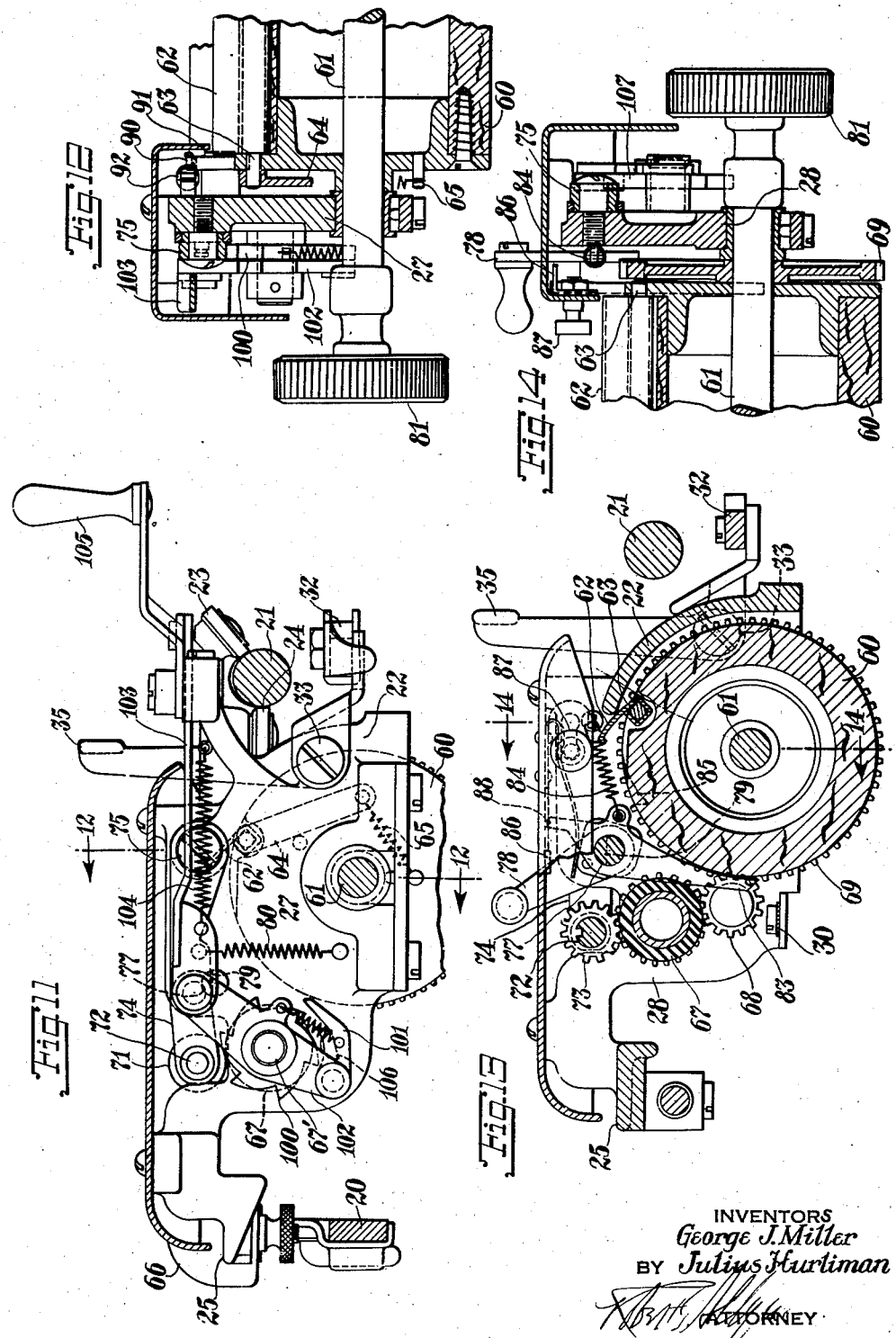
INVENTORS
George J. Miller
BY Julius Hurliman
ATTORNEY Patented Jan. 21, 1936

2,028,516

UNITED STATES PATENT OFFICE 2,028,516

BRAILLE WRITER

George J. Miller and Julius Hurliman, New York, N. Y., assignors to American Foundation for the Blind, Inc., New York, N. Y., a corporation of Delaware Application September 17, 1932, Serial No. 633,586

25 Claims. (Cl. 197—127)

Our invention relates to mechanism for writing by the blind. Such mechanisms are frequently termed Braille writers for producing raised characters.

The main object is to simplify the construction and expedite the use of the various parts. Specifically we have endeavored to provide means for accurately locating the paper in the machine and accurately feeding the paper. We have also sought to provide means for accurately locating and adjusting the embossing dies.

Another object is to provide a uniform impression of the stylus bars for the various keys so as to produce uniform results.

Fig. 1 is a plan view of a machine embodying the improvements of our invention.

Fig. 2 is a front view of the same.

Fig. 3 is a view of the machine taken from the right hand side.

Fig. 4 is a detail sectional view taken on the line 4—4 of Fig. 3.

Fig. 5 is a rear view of the machine.

Fig. 6 is a vertical sectional view on the plane of the line 6—6 of Fig. 1, showing the stylus mechanism.

Fig. 7 is a fragmentary view of the same parts as shown in Fig. 6 but showing them with the stylus bars locked at the end of the line.

Fig. 8 is a detail view of one of the stylus bars.

Fig. 9 is a vertical sectional view on the plane of the line 9—9 of Fig. 1 but on a larger scale.

Fig. 10 is a fragmentary plan view showing the stylus bars and the ends of the operating keys, the same being a partial section on the plane of the line 10—10 of Fig. 9.

Fig. 11 is a view of the left hand end of the line spacing mechanism, and showing parts in section.

Fig. 12 is a fragmentary vertical section on the plane of the line 12—12 of Fig. 11, showing the left hand platen knob and associated mechanism.

Fig. 13 is a fragmentary vertical section taken on the plane of the line 13—13 of Fig. 1, showing the paper feeding mechanism.

Fig. 14 is a fragmentary vertical sectional view on the plane of the line 14—14 of Fig. 13, showing the right hand platen knob and associated mechanism.

The main frame has a rear guide rod 20 and a front guide rod 21 on which the carriage slides from side to side in the usual manner. The front of the carriage has a bar 22 which supports guide rollers 23 and 24. The carriage has a second cross-bar 25 at the rear which supports the roller 26 which travels on the track 20. These bars 22 and 25 are connected at the ends by plates 27 and 28, all of which are preferably formed as a single casting.

A spring tension drum 29 carries a band 30 for applying tension to the carriage.

The escapement rack 32 is pivoted at 33, 33 on opposite sides of the carriage frame. A spring 34 holds the rack in its normal position and the rack can be retracted by action of the finger lever 35. The escapement dog (see Figs. 1, 2 and 9) is pivoted on the transverse axis on the pins 36 which are supported by the tie-bar 37. This dog has a tooth 38 which is pivoted on a vertical axis and another tooth 39 which in the normal inactive position engages a tooth of the rack 32. The tooth 38 is under tension of the spring 40.

The various key levers 42, 43, etc. are hinged to the shaft 44 which also supports the space key lever 45. Beneath all of these levers is located the universal bar 46 which is also hinged on the shaft 44. The universal bar is connected by an axle link 47 to the toothed dog of the escapement so that whenever the universal bar is depressed by the key levers or the space key the escapement is actuated.

Each of the key levers and the space lever is, of course, provided with a spring 48 for holding it yieldingly in its normal raised position.

A back spacer may be provided consisting of a toothed part 50 hinged at 51 to the upper arm of a bell crank lever 52. A finger lever 53 has connected to it an arm 54 which engages the lower arm of the bell crank lever 52. The part 50 is under tension of spring 55 and is guided in an inclined slot 56 so that when the finger lever 53 is depressed it draws the toothed part 50 toward the right and the slot 56 forces the toothed end into engagement with the rack 32 so as to pull the carriage toward the right.

The drum 60 (see Figs. 9 and 13) has a shaft 61 which is supported in the side plates 27 and 28. This drum carries a gripping jaw 62 which is hinged at 63 to the drum. This gripping jaw has an arm 64 which is under tension of a spring 65 which tends to open the jaw or move it to the position shown in Fig. 9 so as to leave a space beneath the jaw into which the paper is to be fed. This jaw also serves as a stop to definitely position the inserted paper. The cross-bar 25 at the rear of the machine serves as a support or introductory guide for the paper (see Fig. 5). The left hand end of the bar is provided with a gauge 66 which definitely limits the left hand edge of the sheet. The paper gauge 66 may be a part of the plate or rod 66' which extends underneath the bar 25 and may be adjustably clamped in position so as to permit adjustment.

A lower feed roller 67 has a shaft 67' supported in the side plates of the carriage and geared to the main drum 60 through an idler pinion 68 and a gear wheel 69 on the end of the drum. At each end of the feed roller 67 are upper feed rollers 70 and 71 mounted on a shaft 72, which has a gear 73 meshing with the gear on the end of the lower roller 67. The shaft 72 is carried by arms 74 at opposite ends which are pivoted at 75. Guards 76, which are slidable on the shaft 77, serve to position the rollers 70 and 71 longitudinally with respect to the margins of the sheet.

The shaft 77 has a finger lever 78 on the right hand side of the machine. The shaft also has a flattened cam-like portion 79 beneath each of the arms 74 so that when the finger lever 78 is pressed toward the front the shaft 77 will be rotated and lift the two arms 74 with the attached rollers 70 and 71 and thus permit the introduction or retraction of the paper. When the rollers 70 and 71 are raised a free passage is left for the introduction of the sheet of paper to be inserted beneath the jaw 62 without binding any of the feed rollers. A spring 80 draws down the upper feed rollers when the finger lever 78 is released.

The drum 60 has a knob 81 on each end of its shaft 61 by which the drum can be rotated.

As the drum is rotated anti-clockwise from the position shown in Fig. 9 the paper gripping jaw 62 engages the curved abutment or rear surface of the cross-bar 22 of the carriage and is forced down into gripping engagement with the end of the sheet of paper where it is held throughout the further rotation of the drum. The guide fingers 82 serve to hold the jaw 62 in the gripping position as the drum rotates. It will be understood, however, that as the upper and lower guide rollers are geared to the drum the paper will be fed positively at the proper rate and the jaw 62 serves largely as a positioning and guiding device.

To definitely notify the operator when the end of the normal sheet has been reached we provide a stop finger 83 (see Fig. 13) which is loosely pivoted on the shaft 77 and under tension of a spring 84. The drum has a notch 85 and when the drum rotates so as to bring the notch 85 beneath the tip of the stop lever 83 the spring 84 pulls the stop lever into the notch 85 and stops the further rotation of the drum. This stop lever 83 can be disabled by means of a slide 86 operated by the knob 87.

The slide 86 is adapted to engage the upper end 88 of the stop lever 83 so as to prevent the spring 84 from pulling the stop lever into the notch 85 in case it is desired to use a longer sheet of paper.

An additional latch 90 is hinged at 91 and normally under tension of a spring 92, tending to bring the hook of the latch into a notch 93 in one edge of the drum. Another arm of this latch engages a cam portion 94 on the shaft 77 which works in unison with the lifting of the upper guide rollers 70 and 71 so that as the upper guide rollers are lifted to permit insertion of the sheet the latch 90 is retracted to permit the subsequent rotation of the drum.

On the end of the shaft of the lower feed roller is mounted a ratchet 100 adapted to be rotated step by step by a spring pressed pawl 101 which is carried by a rocker 102 mounted on the shaft alongside of the ratchet. A link 103 connected at the upper end of the rocker 102 is under tension of a spring 104, tending to pull it toward the operator. The front end of the link 103 is pivoted to one arm of an operating lever 105 so that when the knob of the lever 105 is moved toward the right as viewed in Fig. 1 the link 103 is pushed toward the rear which swings the rocker 102 in a direction to cause the pawl 101 to move toward a tooth of the ratchet 100. Normally a cam 106 holds the pawl 101 out of engagement but when the lever 105 is actuated as above stated the pawl 101 slips off the cam 106 and engages one of the teeth of the ratchet. When the handle of the lever 105 is released the spring 104 returns the operating lever, the link and the rocker to their normal positions of rest and the pawl is thrown out by the action of the cam 106.

On the right hand end of the shaft 67' (see Fig. 3) is mounted a notched detent wheel 107 which is engaged by the swinging detent roller 108 which is under tension of the spring 109 so as to hold the lower feed roller in a definite position for proper line spacing.

The embossing or character-forming mechanism consists of punch and die members or stylus and matrix members of any suitable number to conform to the particular system employed, for instance, six stylus bars and six corresponding matrix faces.

It is of the greatest importance that the impressions be of absolutely uniform size and in definite standard positions in order to enable one to read the writing accurately and rapidly. For this reason the construction and adjustment of the embossing mechanism is of the greatest importance.

The stylus bars 111, 112 and 113 are duplicated on each side of the center and adapted to slide in a box 114 in which they are held by a face plate 115. Each of these bars is held downwardly by a spring 116 and is notched at the side to receive the rear end of one of the key levers such as 42 in rear of the pivot shaft 44 so that when a key is depressed the rear end of the key lifts the corresponding stylus bar and when the key is released the spring returns it.

This stylus box is provided with lugs at opposite sides which are secured to the base 117 by screws 118. The entire collection of stylus bars may thus be assembled and applied or removed as a unit.

The matrix member 120 has recesses to correspond with the tips of the stylus bars. This matrix member is secured to the rear end of a gooseneck member 121 by means of screws 122 and 123. Preferably there is a slight amount of play between the screws and the passages in the gooseneck so that a slight amount of adjustment of the matrix member may be effected. The front end of the gooseneck 121 has an extended foot 124 secured by screws 125 to the front plate or cross-bar 37 of the frame of the machine. Positioning dowels 126 are also preferably provided.

In assembling the mechanism the stylus box 114 will ordinarily be secured in place in its proper position. The gooseneck 121 is then secured in place with the matrix member 120 accurately located on the tips of the stylus bars. When the gooseneck has been secured firmly in position the keys are again depressed so that the stylus bars are raised into the matrix recesses. The matrix member is clamped securely in its proper position.

It will be obvious that the position of the matrix member 120 may be vertically adjusted by using one or more shim pieces or by substituting a matrix member of greater or less thickness so as to allow for different thicknesses of paper and also to allow for the wear of the various parts. In fact, the mechanism herein shown and described may be made so accurately and so rugged that it can be employed for stamping or embossing sheet metal.

In order to stop the piling up of characters at the end of a line we provide a line locking device (see Fig. 7) consisting of a slide 130 which is guided on screws 131 on the upper end of the stylus box. This slide is held in its normal position by a spring 132 and each of the stylus bars has a notch or cut-out portion 133 so that the slide does not interfere with the movement of the stylus bars. When the end of a line is reached, however, the slide 130 is engaged by a pin 134 (see Fig. 1) carried by the carriage, which pin forces the slide from the position shown in Fig. 6 to the position shown in Fig. 7, where it will be seen that the slide stands in the path of upward movement of the stylus bars, thus locking them in place. This stop pin 134 is carried by a sleeve 135 which is adjustable longitudinally on the rod 136. Finger piece 137 may be provided for adjusting the stop 134 as is common in mechanism of this character.

This sleeve 135 may also carry a signal actuating member 140 (see Fig. 5) adapted to engage the upper end of the lever 141 and strike the hammer 142 against the bell 143.

An adjustable carriage stop 145 may also be provided to engage a buffer 146 so as to stop the movement of the carriage when the line is completed.

It will be seen that an effort has been made to make the parts as simple and rugged as possible and use few projections or traps for the operator. In other words, to adapt the machine generally to the convenience of the blind operator.

The paper can be readily inserted, removed and replaced accurately to definite positions. The mechanism is designed to produce such accurate work that the operator can turn the sheet back and forth for the purpose of making corrections with assurance that the corrections can be inserted at exactly the points desired. These features are obviously of the greatest importance in a machine for the use of the blind.

We claim:

1. An embossing writer including a rotatable drum for the paper, introductory feed rolls leading to the drum, a paper clamping jaw carried by the drum, means interlocking with the drum to stop its rotation at a predetermined point, and means for simultaneously retracting one of said rolls and said stopping means.

2. An embossing writer including a rotatable drum for the paper, introductory feed rolls leading to the drum, a paper engaging and positioning jaw carried by the drum for initially positioning one end of the paper, means interlocking with the drum to stop its rotation and position the jaw at a predetermined point for initially positioning the other end of the paper, and manually controlled means including a handle for releasing said interlocking means.

3. An embossing writer including a rotatable drum, a paper gripping and positioning jaw hinged to said drum, feed rolls geared to said drum, a stationary guide for automatically actuating the jaw in one direction as the drum is rotated and an automatic device for stopping the drum and jaw at a predetermined point for positioning the paper in proper initial position for writing thereon.

4. In a blind-writing machine having a character-embossing field, paper feeding mechanism including opposed feed rolls, means, movable into and out of effective position, for gaging the rotation, in either direction, of said feed-rolls to a normal position, means for separating said rolls slightly to admit a work-sheet, means for gaging the distance the bottom of said work-sheet is entered between the separated rolls preparatory to casting off the first gaging means and bringing the rolls together again and then rotating the rolls to bring the head of said sheet to writing position, and means limiting the rotation of said rolls from said normal position to thereby gage said head of the sheet to said field.

5. In a blind-writing machine, the combination with character-embossing means forming a gap for admitting a work-sheet, of opposed feed-rolls arranged tangentially to one another at a line in advance of said gap so that a sheet introduced through said gap, one end first, is received between said feed-rolls, a take-up roll geared to one of said feed-rolls and arranged to receive and roll up said sheet as it emerges from the feed-rolls when the latter and the take-up roll are rotated to bring the first line position of said sheet to said embossing means, and means for separating said feed-rolls at their point of tangency preparatory to admitting said work-sheet, said take-up roll having means to keep said first sheet-end closely against its periphery to thereby co-operate with the joint rotation of the take-up roll and feed-rolls for rolling up the sheet without creasing.

6. In a blind-writing machine having an embossing field, the combination of opposed feed-rolls, means for separating said feed-rolls slightly to admit a work-sheet, means for gaging the rotation of said feed-rolls in either direction to a starting position, said gaging means being normally ineffective and being rendered effective upon separation of said feed-rolls, means for gaging the extent of insertion of the bottom of the work-sheet between the separated feed-rolls, said feed-rolls being then brought together again and then rotated to bring the head of the sheet to the embossing field, and means for gaging said latter rotation of the feed-rolls, said latter gaging means being rendered ineffective upon separation of the feed-rolls so that the same may be rotated in either direction, said latter gaging means being restored when the feed-rolls are brought together again.

7. In a blind-writing machine having a letter-feeding carriage, the combination of a carriage-frame, a feed-roll journaled in said frame, a pressure-roll co-operating with said feed-roll, a shaft mounting said pressure-roll, side arms pivoted at the sides of the carriage-frame and supporting said shaft, a rod journaled in said carriage-frame and extending transversely of and contiguous to said side arms, said rod having cams co-operating with said side arms, so that, upon partial revolution of said rod from a normal position, the pressure-roll is slightly separated from the feed-roll to admit a work-sheet, spring means tending to swing said arms and thereby bring the pressure-roll against the feed-roll, said cams permitting the pressure-roll to so engage said feed-roll in the revolution of said rod back to normal position, means including a pawl for gaging the rotation of said rolls to a sheet-receiving position, means gaging the extent of insertion of the bottom of the sheet between the separated feed and pressure rolls, and means including a second pawl for gaging the rotation of said feed and pressure rolls to advance the head of the inserted sheet to the writing point, said pawls being controlled by the revolution of said rod so that the first pawl is rendered effective and the second pawl is rendered ineffective upon separation of said rolls, the second pawl becoming effective and the first pawl ineffective upon said rolls being brought together again.

8. In a blind-writing machine having an embossing field, the combination of opposed feed-rolls for feeding a work-sheet through said field, said feed-rolls being slightly separable to admit the work-sheet bottom edge first, a take-up roll geared to said feed-rolls for receiving the bottom edge of the work-sheet and rolling the sheet up as the feed-rolls and take-up roll are jointly rotated to bring the head of the sheet to the embossing field, said take-up roll having a pivoted strip extending lengthwise of the take-up roll and being substantially tangent to its periphery, and spring means effective when the take-up roll is in sheet-receiving position, to swing said strip about its pivots so that it forms, with the take-up roll periphery, a sheet-receiving throat at the bottom of which is provided a shoulder against which the bottom edge of the sheet is presented, said strip, the sheet movement imparted by rotation of the feed-rolls, and the coacting rotation of the take-up roll co-operating to roll the sheet upon the take-up roll without creasing.

9. In a blind-writing machine having an embossing field, the combination of opposed feed-rolls for feeding a work-sheet through said field, said feed-rolls being slightly separable to admit the work-sheet bottom edge first, a take-up roll geared to said feed-rolls and arranged for receiving the bottom edge of the work-sheet and rolling the sheet up as the whole train is rotated to bring the head of the sheet to the embossing field, said take-up roll having a gage to which the bottom edge of the sheet is presented, and means automatically rendered effective by separation of the feed-rolls for gaging the rotation of the rolls, to bring the gage on the take-up roll to sheet-receiving position, said means being disengaged when the feed-rolls are brought together again.

10. In a blind-writing machine having an embossing field, the combination of opposed feed-rolls for feeding a work-sheet through said field, said feed-rolls being slightly separable to admit the work-sheet bottom edge first, a take-up roll geared to said feed-rolls for receiving the bottom edge of the work-sheet and rolling the sheet up as the whole train is rotated to bring the head of the sheet to the embossing field, said take-up roll having a gage to which the bottom edge of the sheet is presented, means for gaging the rotation of the rolls, to bring the gage on the take-up roll to sheet-receiving position, and further means for gaging the rotation of the rolls to bring the head of the sheet to the embossing field.

11. In a blind-writing machine having a horizontal group of embossing points; a paper-feeding carriage having end members, a lower feed-roll journaled in said end members, a pressure-roll overlying and slightly separable from said feed-roll, said rolls being of relatively small diameter and close to and in front of said embossing points, in order to hold a sheet while writing close to the bottom thereof, a sheet take-up roll of relatively large diameter geared to said feed roll and journaled in said end members forwardly of the feed and pressure-rolls, said carriage having a cross-member with a concave surface close to the front of the take-up roll, the top of the take-up roll, the tangent line of the feed and pressure rolls and the embossing points being in substantially the same horizontal plane, a flap overlying a segment of the take-up roll periphery and being pivoted at its forward portion close to said periphery, and a spring tending to swing said flap outwardly to form a throat for receiving and gaging the bottom edge of a work-sheet inserted between the feed and pressure rolls, an upper edge of said carriage-cross member being far enough forward to expose said flap and permit it to open when the take-up roll has been rotated to bring the flap on top, the concave surface of said cross-member closing said flap toward the take-up-roll periphery upon rotation of the train of rolls to bring the head of the sheet to the embossing points.

12. A carriage constructed according to claim 11, the concave surface of said cross-member extending part way around the front of the take-up roll and having a tongue forming an extension of said concave surface reaching close to the over-lying sheet extending from the feed-roll to the take-up roll.

13. A carriage constructed according to claim 11, the concave surface of said cross-member extending part way around the front of the take-up roll and having a tongue forming an extension of said concave surface reaching close to the overlying sheet extending from the feed-roll to the take-up roll, the free end of said tongue being flared from the take-up-roll periphery to cam said flap shut when the take-up roll is rotated reversely after the flap has passed said tongue-end.

14. In a blind-writing machine having front and rear carriage-tracks, a carriage constructed according to claim 11 including means disposed forwardly of said carriage-cross member and engaging the front carriage-track, said carriage having a rear cross-member behind the embossing points, means on said rear cross-member engaging the rear carriage-track, means including a handle for separating the pressure and feed rolls, said handle being disposed at the right end of the carriage, means for gaging the rotation of said train of rolls also disposed at the right end of the carriage, a line-spacing mechanism at the left end of the carriage, a shield covering the track-engaging means at the front of the carriage and formed to blend at its rear end with the top of the take-up roll, the forward edge of said shield being well rounded downwardly, and shields topping the carriage and members and covering the mechanism at the right and left ends of the carriage, said roll-separating handle extending upwardly through an opening in the top of the right shield, said front and side shields conducing to smoothness of contour of the top of the carriage.

15. In a blind-writing machine having a writing field, the combination with a feed-roll train and a frame supporting said train, of a revoluble member connected to said feed-roll train in such a way that said member makes less than a revolution in bringing the head of a work-sheet of certain height to the writing field, a pawl mounted on said frame and co-operating with a stop on said member to limit the rotation of said feed-roll train to thereby gage the head of said sheet to the writing field, and means engaging said pawl and adjustable on said frame to either hold the pawl in cast-off position, or to permit said pawl to be effective, said pawl when cast-off permitting the feed-roll train to be rotated to bring the head of a higher sheet to the writing field.

16. In a blind-writing machine having a writing field, the combination with a feed-roll train and a frame supporting said train, of a revoluble member connected to said feed-roll train in such a way that said member makes less than a revolution in bringing the head of a work-sheet of certain height to the writing field, a pawl mounted on said frame and co-operating with a stop on said member to limit the rotation of said feed-roll train to thereby gage the head of said sheet to the writing field, means engaging said pawl and adjustable on said frame to either hold the pawl in cast-off position, or to permit said pawl to be effective, said pawl when cast off permitting the feed-roll train to be rotated to bring the head of a higher sheet to the writing field, and a feeler-gage on said frame, operative when the top of the higher sheet is gaged thereto to gage the head of said higher sheet to the writing field.

17. In a blind-writing machine, the combination with character-embossing means forming a gap for admitting a work-sheet, of opposed feed-rolls arranged tangentially to one another at a line in advance of said gap so that a sheet introduced through said gap, one end first, is received between said feed-rolls, and a take-up roll geared to one of said feed-rolls, and arranged to receive and roll up said sheet as it proceeds from the feed-rolls when the latter and the take-up roll are rotated to bring the first writing-line position at the other end of said sheet to said embossing means, said take-up roll having means to keep said first sheet-end close against its periphery to thereby cooperate with the joint rotation of the take-up roll and feed-rolls for rolling up the sheet without creasing.

18. In a blind-writing machine, the combination with embossing pins and an anvil normally separated from said pins by a sheet-receiving gap, of a letter-feeding carriage, a feed-roll revolubly mounted in said carriage, a releasable pressure-roll tangent to said feed-roll, said rolls being disposed to feed a sheet beginning with the top thereof through said gap, said rolls being of relatively small diameter so that they may be disposed close enough to said gap to still grip the sheet when the bottom line thereon is being embossed, and a take-up roll geared to said feed-roll and being of substantiallly larger diameter than said feed-roll, all of said rolls being disposed so that the periphery of the take-up roll, the tangent line of the feed and pressure rolls and said gap are substantially in line, said take-up roll having means to hold the sheet to its periphery without creasing, said means being co-operative with the movement of the sheet imparted by the feed and pressure rolls, to cause the sheet to become wound around the take-up roll as the latter is rotated jointly with said feed and pressure rolls to bring the top of the sheet to the embossing pins.

19. In a blind-writing machine having a horizontal embossing plane, the combination with the group of embossing pins under said plane and an upper anvil from which the pins are normally separated by a sheet-receiving gap, of a letter-feeding carriage, a lower feed-roll revolubly mounted in said carriage so that the top thereof is substantially tangent to said plane, a releasable pressure-roll over said feed-roll and tangent thereto, said rolls being disposed to feed a sheet through said gap, said rolls being of relatively small diameter so that they may be disposed close enough to said gap to still grip the sheet when the bottom line thereon is being written, and a take-up roll geared to said feed-roll, said take-up roll being of substantially larger diamter than said feed-roll and disposed so that the top thereof is tangent to said plane, said take-up roll having means to hold the sheet to its periphery without creasing, said means being co-operative with the movement of the sheet imparted by the feed and pressure rolls to cause the sheet to become wound around the pressure-roll as the latter is rotated jointly with said feed and pressure rolls to bring the top of said sheet to the embossing point.

20. In a blind-writing machine having an embossing field, the combination of opposed separable feed-rolls for feeding a work-sheet through said field, a take-up roll for receiving the end of the sheet as the latter is introduced between and beyond the separated feed-rolls, and gearing connecting said take-up roll to said feed-rolls for joint rotation, said take-up roll having at its periphery a gage to which the end of the sheet is presented, and also having means overlying said periphery and under which the sheet is inserted, said means co-operating with the sheet-movement imparted by the rotation of the re-engaged feed-rolls, and with the co-operating rotation of the take-up roll to wind the sheet without creasing upon the take-up roll.

21. In a typing machine having a writing field; paper-feeding means including opposed, separable feed-rolls, means for gaging the rotation of said rolls to a normal position, means for gaging the distance a work-sheet is entered between the separated, normally-positioned rolls preparatory to rotation of the rolls, to bring the head of the sheet to writing position, and means for gaging said last-mentioned rotation of the rolls from said normal position, to thereby gage said head of the sheet to said field.

22. In a typing machine having a writing field; the combination of opposed, separable feed-rolls, a take-up roll geared to said feed-rolls for rotation jointly with the latter, said take-up roll having at its periphery means for gaging and retaining the bottom edge of a work-sheet introduced between the separated feed-rolls, the train of rolls being rotatable to bring said sheet gaging and retaining means to sheet-receiving position preparatory to introducing the sheet, said train of rolls, after the introduction of the work-sheet and the re-engagement of the feed-rolls, being rotated to bring the head of the sheet to the printing field, and means for gaging said last-indicated rotation of the train, to thereby gage said head of the sheet to the printing field.

23. The invention as set forth in claim 22, said rotation-gaging means being adjustable to render same effective or ineffective.

24. The invention as set forth in claim 22, said rotation-gaging means being automatically rendered ineffective by separation of the feed-rolls and effective by re-engagement of the feed-rolls 25. The invention as set forth in claim 22, said rotation-gaging means being automatically rendered ineffective by separation of the feed-rolls and effective by re-engagement of the feed-rolls, means being also provided whereby said rotation-gaging means may be kept ineffective at will independently of the feed-rolls.

GEORGE J. MILLER.
JULIUS HURLIMAN.